United States Patent
Sozzani et al.

(10) Patent No.: US 7,620,186 B2
(45) Date of Patent: Nov. 17, 2009

(54) METHOD FOR ESTABLISHING AN ENCRYPTED COMMUNICATION BY MEANS OF KEYS

(75) Inventors: Fabio Sozzani, Vimodrone (IT);
Roberto Valerio Sannino, Milan (IT);
Guido Marco Bertoni, Cusano Milanino (IT); Gerardo Pelosi, Matera (IT);
Pasqualina Fragneto, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 725 days.

(21) Appl. No.: 10/952,549

(22) Filed: Sep. 28, 2004

(65) Prior Publication Data
US 2005/0102507 A1 May 12, 2005

(30) Foreign Application Priority Data
Sep. 29, 2003 (EP) .................................. 03425626

(51) Int. Cl.
*H04L 9/08* (2006.01)
*H04L 9/00* (2006.01)
(52) U.S. Cl. ...................................... 380/277; 380/278
(58) Field of Classification Search .......... 380/277–278
See application file for complete search history.

(56) References Cited

U.S. PATENT DOCUMENTS

2003/0081785 A1* 5/2003 Boneh et al. ................. 380/277
2004/0104097 A1* 6/2004 Ngee .......................... 194/210
2004/0123098 A1* 6/2004 Chen et al. ................... 713/155

FOREIGN PATENT DOCUMENTS

WO    WO 01/84271 A2    11/2001
WO    WO 03/077498 A1    9/2003

OTHER PUBLICATIONS

Menezes et al. (Alfred J. Menezes, Paul C. van Oorschot, Scott A. Vanstone, "Handbook of applied cryptography", 1997, ISBN: 0849385237), p. 32 and 570-572.*

(Continued)

*Primary Examiner*—Kambiz Zand
*Assistant Examiner*—Peter Poltorak
(74) *Attorney, Agent, or Firm*—Lisa K. Jorgenson; E. Russell Tarleton; Seed IP Law Group PLLC

(57) ABSTRACT

A method of establishing an encrypted communication by using keys between a first electronic device associated with a first trusted authority and a second electronic device, including generating a first secret key associated with the first device for the management of the communication, generating, at least in part by the first authority, a second secret key associated with the second device for the management of the communication. The method includes generating the first key at least in part by a second trusted authority associated with the second device that is distinct and autonomous from the first authority. Alternatively, the generation of the first key is performed, at least in part, by the second device passing through the second trusted authority.

34 Claims, 4 Drawing Sheets

OTHER PUBLICATIONS

Dan Boneh and Matthew Franklin, "Identity-Based Encryption from the Weil Pairing", Proceedings of Crypto 2001, vol. 2139 of Lecture Notes in Computer Science, p. 213-229, Springer-Verlag, 2001.*

Tyron Stading, "Secure Communication in a Distributed System Using Identity Based Encryption", ISBN: 0-7695-1919-9, May 2003.*

Marc Joye and Sung-Ming Yen, "ID-based secret-key cryptography", ACN SIGOPS Operating Systems Review, vol. 32, Issue 4 (Oct. 1998).*

N..P. Smart, "An identity based authenticated key agreement protocol based on the Weil pairing", Electronics Letters, 38, 630-632, 2002).*

* cited by examiner

METHOD FOR ESTABLISHING AN ENCRYPTED COMMUNICATION BY MEANS OF KEYS

BACKGROUND OF THE INVENTION

1. Field of the Invention

The present invention relates to a method for establishing a connection between electronic devices enabling the safe transmission of digital data.

2. Description of the Related Art

Nowadays, a great amount of digital data is transmitted, for example, through mobile radio communication networks. Particularly, portable electronic communication devices such as palm-held computers (small pocket-sized computers) and last generation cellular telephones allow to download suitable software directly from the Internet to be used in multi-medial applications. Thus, each user can access, at any moment, a growing number of digital services by connecting by means of such portable devices to suitable remote Internet servers using mobile radio communication networks of the GSM, GPRS or UMTS type. Some of the services that can be accessed by the user relate to, for example, multi-medial commerce (m-commerce), banking operations (mobile banking) or simply access to websites.

Since this information that is transmitted between the portable devices and remote servers is often sensitive and confidential, it is necessary to ensure its secrecy by resorting to procedures and methods of encryption that make them inaccessible to unauthorized persons.

As known, in the more versatile encryption methods the information, or messages, to be transmitted are encoded by the use of two basic elements: a set of fixed rules that constitute the encryption algorithm and one or more variable encryption keys. The algorithm is formed by enciphering and deciphering procedures that, normally, are identical to one another or are obtained by applying the same rules in an inverse order, but that can also be different. The keys are either numbers, generally of a binary type, or characters. Such keys are used to encipher/decipher a non-enciphered/enciphered text obtaining an enciphered/non-enciphered text. In the encryption methods currently in use, the encryption algorithm is known and the security of the transmission of encrypted data lies in the secrecy of the keys.

For example, in a symmetrical type encryption method, a single private or secret key is used both to encrypt and decrypt the message to be transmitted. This presupposes that the devices that want to communicate in an encrypted way must first exchange this private key. Generally, the private key, which is generated in a random way, is exchanged through a side channel. The advantage of the private key method lies in the computational simplicity required to encrypt and decrypt the messages.

The asymmetric or public key encryption methods envisage the use of two separate keys: an encryption key for encrypting the data to be transmitted and a decryption key for decrypting it. For these methods the encryption key is public, that is it is known or can be easily discovered through a public directory. Vice versa, the decryption key is private, therefore secret. For example, in order to transmit an encrypted message in public key to a receiver device, a sender device must encrypt this message with the receiver's known public key. The confidentiality of the message transmitted is guaranteed as only the receiver device is capable to decrypt the message using its own private key.

Conventional public key encryption methods have lead to the creation of a standard safety architecture known as public key infrastructure (PKI) that ensures a good level of security in communication between devices, for example via the Internet. In order to encrypt the messages, the current PKI methods adopt a hybrid approach, that is they simultaneously use the public key encrypting method and the symmetrical type method. Particularly, in the hybrid approach, a transmitting device uses the public key of a receiver device (which is known) to encrypt a random number known as the session key. This session key, sent in an encrypted way to the receiver device, represents a current secret key used by the same transmitter device to encrypt in a symmetrical way the entire message to send to the receiver device. In accordance with the symmetrical type encrypting method, the receiving device can decipher the message received only using the same session key with which the message was enciphered. In the case under discussion, the receiving device knows this correct deciphering key, i.e., the session key obtained by decrypting with its private key the encrypted session key obtained by the transmitting device.

Conveniently, the term user will also be hereafter used to indicate the generic device that transmits and receives data in an encrypted way.

The fundamental problem of public key encryption methods is that of ensuring the correct and unambiguous correspondence between any device or user that communicates with such a method and its own public key. For this purpose, the PKI infrastructure introduces the figure of a Certification Authority CA. The Certification Authority for a method of transmission of encrypted data is a supervising body, external to each user, having its own processing means, databases and means of transmission data. The function of this body is to register the public key and the identity of each user in digital certificates thus ensuring the authenticity of the keys and the identities registered in the above-mentioned certificates. Moreover, the certificates subscribed by the Authority CA are published in suitable directories made freely available. In this way, each user can freely access the public key of any other user.

It is useful to observe that in the PKI, encrypted communication using keys is preceded by a step in which the devices that communicate must, initially, mutually identify and authenticate one another. Particularly, each device declares its own identity by establishing with the other a communication based on the reliability and impartiality of the Certification Authority CA. As an example, prior to true encrypted communication, an initialization step is foreseen in which each device generates in an autonomous way its own public key and its own private key. The public keys of both devices are registered with the Certification Authority CA, which transfers to both devices the corresponding certificates of authentication. These certificates are stored, together with the corresponding private key, in suitable memories internal to these devices. During a subsequent authentication step, each device in question provides the other with its own certificate, verifies the validity of the certificate obtained and extracts from it the public key of the other device with which it wants to establish encrypted communication.

For the PKI infrastructure, encrypted communication can only be established if all system users recognize the guarantee and supervision authority carried out by the Certification Authority CA.

A more recent alternative to the PKI is the method based on the IBE (Identity Based Encryption) identity. The IBE method also foresees the use of a public key and a private key for encrypting and decrypting the messages, respectively. In particular, the public key is obtained from a string that indicates, in an unequivocal manner, the identity of the user that transmits through IBE (for example the user's tax code), whereas the corresponding private key is supplied to each user by a central authority denominated Trusted Authority (TA). The Authority TA defines and makes public its rules, that is, for example, the mathematical functions or parameters, with which the same Authority TA generates the encryption and decryption keys. On the basis of such rules and through a secret master key, the Trusted Authority TA generates the private key of each user starting from the corresponding identity of the user. Subsequently, this private key is transmitted to the corresponding user in order to be stored in a memory internal to the latter that, usually, is an electronic device.

The Trusted Authority TA structurally comprises processing means and databases in which are stored the private keys assigned and transmitted to the users who communicate in an encrypted way.

It is useful to observe that the Trusted Authority TA does not certify the public keys that are directly obtainable from the user identities. Thus, each device that communicates by means of the IBE method only has to store its own private key with a considerable saving of memory occupation.

Moreover, with the IBE method, the authentication between devices step is implicit: if a device can decrypt the message sent to it, it is automatically authenticated.

In addition, with the IBE method it is simpler, in relation to PKI, to create a public key having a finite temporal duration, that is linked to an expiry date. In other words, after a predetermined date all the messages encrypted with that key cannot be decrypted unless through a new private key corresponding to a new expiry date.

Finally, the database of the Trusted Authority TA could always be accessible to the police authorities. It is thus possible to know, in any moment, the private key of each system user and in case of necessity, to decrypt his messages.

The transmission of data encrypted using keys has become an essential need in various ambits, such as, for example, in the case of mobile telephone networks.

It is important to observe that the current cellular telephones are authentic electronic platforms comprising various subsystems such as, for example, a mobile equipment, a smart card or a removable memory device.

In definitive, it is hoped that each of these subsystems can establish an encrypted communication, both with another subsystem of the same cellular telephone and with another generic device such as, for example, a remote Internet server.

Currently, encrypted communication between mobile equipment and a smart card is not made.

In actual fact, such devices are produced and sold by companies that are independent of one another (for example, the producing company of the mobile equipment and the mobile telephone provider) that have market interests that are different and in some cases conflicting.

As a consequence, each of such companies accepts only within certain limits to exchange with others the information contained in its own databases, such as for example, the identity codes of the devices it produces. Therefore, the mutual identification and authentication steps of the devices in communication, indispensable for making correct encrypted communication, are compromised.

In addition, these companies do not accept that an external supervision authority, such as the PKI architecture Certification Authority CA, manages the encrypted communication protocol or the acquisition of sensitive and confidential data such as the public and private keys.

Finally, the method for transmitting encrypted data between subsystems that communicate must be transparent to the user of the cellular telephone, that is, it must not oblige such user to perform complex operations.

BRIEF SUMMARY OF THE INVENTION

The disclosed embodiments of the present invention provide a method for establishing encrypted communication by means of a key that is better than the known methods.

In accordance with one embodiment of the invention, a method for establishing an encrypted communication by means of keys between a first electronic device associated with a first trusted authority and a second electronic device associated with a second trusted authority is provided. The method includes the steps of generating a first secret key associated with the first device for the management of said communication and storing it in the first device; generating, at least in part by means of said first authority, a second secret key associated with the second device for the management of said communication and storing it in the second device, wherein the step of generation of the first key is performed at least in part by means of a second trusted authority separate and autonomous in relation to said first authority, said second authority associated with the second device for the management of said communication, and wherein the first key and the second key are kept secret from the second and the first trusted authority, respectively.

In accordance with another embodiment of the invention, a system of encrypted communication by keys is provided that includes a first electronic device associated with a first trusted authority and a second electronic device associated with a second trusted authority, the first and second devices configured so that the encrypted communication is established in accordance with the method set forth above. Ideally, the first electronic device is a smart card and the second electronic device is a mobile telephone.

In accordance with a further embodiment of the invention, a method of encrypted communication between a first and a second electronic device is provided, the method including generating a first secret key associated with the first device at least in part by means of a second authority associated with the second electronic device that is distinct and autonomous from a first authority; generating a second secret key associated with the second device at least in part by means of a first trusted authority associated with the first electronic device; and maintaining the first secret key secret from the second trusted authority and maintaining the second secret key secret from the first trusted authority.

In accordance with yet a further aspect of the present invention, a method of encrypted communication is provided, and more particularly, a method of encrypted communication between first and second electronic devices is provided that includes the steps of: generating a first public key obtained from the identity of the first electronic device; generating a first private intermediate key obtained from the first public key and from a first master key available to the first trusted authority; generating from the first trusted authority a first symmetrical secret key associated with the first device to be used for encrypted communication of a symmetrical type between the first electronic device and the first trusted authority, the first symmetrical key obtained starting from the first intermediate key; generating by the second authority a second symmetrical secret key associated with the second electronic device that is generated, at least in part, by means of the first trusted authority; supplying the first symmetrical key to the first electronic device; and sending in a non-encrypted mode from the first electronic device to the second electronic device, and vice versa, the identity of said first and second electronic devices and said first and second trusted authorities, respectively.

BRIEF DESCRIPTION OF THE SEVERAL VIEWS OF THE DRAWINGS

The features and advantages of the present invention will clearly appear in the following detailed description of an embodiment thereof, given by way of non limiting example, in connection with the attached drawings, wherein.

DETAILED DESCRIPTION OF THE INVENTION

It should be pointed out that certain steps of the method of the disclosed embodiments of the present invention provide an encrypted communication using keys that can be carried out by means of a symmetrical or private key type method or an asymmetrical identity-based IBE method. These two methods have general properties and characteristics, which are known to those skilled in the art and in accordance with that described above.

Figure 1:
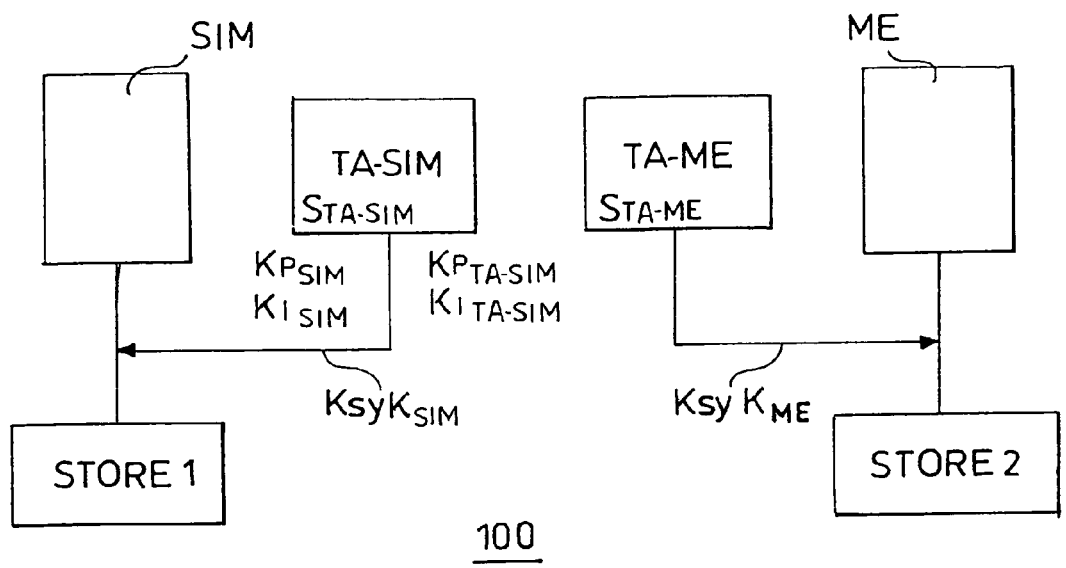
FIG. 1 is a schematic of an example of an encrypted communication system in accordance with the present invention.

FIG. 1 schematically shows a system 100 in accordance with the present invention and comprising a first electronic device SIM and a second electronic device ME destined to communicate in an encrypted way. According to a preferred embodiment to which reference will be made in the description below, the first electronic device SIM is a user identification module, i.e., a smart card containing the user's identification data, and any other information that allows the user himself to make or receive telephone calls. Preferably, the second electronic device ME is a mobile equipment, i.e., a mobile telephone such as to operate, for example, within the ambit of a cellular telephone system. Initially the second device ME is devoid of the smart card.

It should be observed that the present invention is advantageously applicable also to other types of electronic devices destined to communicate in an encrypted way. For example, such devices can be a smart card and a remote Internet server.

To the first SIM and second ME electronic device are associated a first Trusted Authority TA-SIM and a second Trusted Authority TA-ME, respectively. The first TA-SIM and the second TA-ME Authority manage the acquisition of the public and private keys by their respective devices, they are physically distinct from one another and do not communicate with one another. In other words, the first TA-SIM and the second TA-ME Authority each comprise a processing system, a database and means for transmitting such data that are distinct from those of the other. In the example proposed, the functions performed by the first TA-SIM and by the second TA-ME Trusted Authority can be exercised directly by a mobile telephone provider and by a company that constructs the mobile electronic equipment, respectively.

Moreover, the first TA-SIM and the second TA-ME Authority can generate the keys to associate to the corresponding device by using, for example, mathematical schemes belonging to the identity-based method of encryption IBE. For example, one of such schemes is that of Boneh and Franklin that is known to one skilled in the art. On the basis of this scheme, each Authority generates the above-mentioned keys using mathematical operations that involve functions and parameters common to both.

In particular, the set of common functions and parameters is indicated with the notation $<G_1, G_2, ê, P, H, H_1>$ where, for example:

$G_1$ is an additive group of points of an algebraic curve;

$G_2$ is a multiplicative finite group;

$ê$ is a bilinear function that associates an element of group $G_2$ to each pair of elements of additive group $G_1$;

P is a point of an algebraic curve, that is an element of additive group $G_1$;

H and $H_1$ are, for example, hash-type mathematical functions. In particular, the first hash function H applied to arbitrary strings converts the latter into elements of the additive group $G_1$. The second hash function $H_1$ applied to elements of the multiplicative group $G_2$ generates bit strings of suitable lengths.

In addition, the first TA-SIM and the second TA-ME Authority also possess a first $s_{TA-SIM}$ and a second $s_{TA-ME}$ master key, respectively. Such first $s_{TA-SIM}$ and second $s_{TA-ME}$ master key are in general distinct from one another and each is secret to the other Trusted Authority.

Moreover, it should be observed that a first $ID_{SIM}$ and a second $ID_{ME}$ identity are associated with the first SIM and the second ME electronic device respectively. Such first $ID_{SIM}$ and second $ID_{ME}$ identity are strings of bits or characters that identify in an unequivocal way the above-mentioned devices and do not represent confidential information.

Below is described a method for establishing an encrypted communication between the first SIM device and the second ME device, in accordance with the invention.

The method of the invention includes an initialization procedure during which each Trusted Authority generates the public and private keys associated with the corresponding device.

In greater detail, the first Trusted Authority TA-SIM generates (and memorizes in its own suitable memory) a first public key $Kp_{SIM}$ associated with the first device SIM. In particular, such first public key $Kp_{SIM}$ is obtained by applying the first mathematical hash function H to the first identity $ID_{SIM}$. Similarly, the second Trusted Authority TA-ME generates (and memorizes in one of its memories) a second public key $Kp_{ME}$, associated with the second device ME, by applying the same first hash type mathematical function H to the second identity $ID_{ME}$. Moreover, a further first $ID_{TA-SIM}$ and a further second $ID_{TA-ME}$ identity are associated with the first TA-SIM and with the second TA-ME Authority, respectively.

During the initialization procedure, in the first device SIM (in particular, in one of its suitable memories) are stored the first public key $Kp_{SIM}$, the further first identity $ID_{TA-SIM}$ and the characteristic parameters of the first Authority TA-SIM.

Similarly, in the second device ME are memorized (in particular, in a respective memory) the second public key $Kp_{ME}$, the further second identity $ID_{TA-ME}$ and the parameters characteristic of the second Authority TA-ME.

The first TA-SIM and the second TA-ME Authority apply the first $s_{TA-SIM}$ and the second $s_{TA-ME}$ master key to the first $Kp_{SIM}$ and the second $Kp_{ME}$ public key, respectively, in order to obtain a first $Ki_{SIM}$ and a second $Ki_{ME}$ intermediate key. The operations of application of the master keys $s_{TA-SIM}$ and $s_{TA-ME}$ to the public keys $Kp_{SIM}$ and $Kp_M$ are performed, for example, in the same way as occurs according to the conventional IBE method for the determination of private keys.

Such first $Ki_{SIM}$ and second $Ki_{ME}$ intermediate key are private or secret keys associated with the first SIM and the second ME device, respectively and are memorized in them. Such keys will be used for the encrypted transmission of particular messages (of which we will speak later) performed according to the IBE modality.

In greater detail, the operation allowing to obtain, for example, the first intermediate key $Ki_{SIM}$ can be performed in accordance with the following expression:

$$Ki_{SIM}=s_{TA-SIM}\cdot Kp_{SIM} \qquad (1)$$

where, as is evident to those skilled in the art, the operator "·" represents an external product in the additive group $G_1$. In particular, this external product can be defined as follows:

$$x\cdot y \rightarrow z,\ x\in\{1,2,\ldots, ord(G1)-1\} y,\ Z\in G1; \qquad (2)$$

where "ord" is the number of elements in group $G_1$.

Subsequently, the first TA-SIM and the second TA-ME Trusted Authority generate a first $Ksyk_{SIM}$ and a second $Ksyk_{ME}$ secret key by applying, for example, a further hash-type mathematic function to the first $Ki_{SIM}$ and the second intermediate key $Ki_{ME}$, respectively. This further hash function is arbitrary and could be different for both Authorities.

The first $Ksyk_{SIM}$ and the second $Ksyk_{ME}$ secret key make it possible to make the symmetrical type encrypted communication between each device and the corresponding Trusted Authority.

It should be observed that the same devices could autonomously generate the first $Ksyk_{SIM}$ and the second $Ksyk_{ME}$ secret key starting from the first $Ki_{SIM}$ and from the second $Ki_{ME}$ intermediate key, respectively, every time it is necessary to communicate in a separate way with the respective Authority. Thus, one would avoid memorizing such secret keys in the corresponding devices during the initialization step.

Alternatively, the first $Ksyk_{SIM}$ and the second $Ksyk_{ME}$ secret key can be directly preset by each Authority and assigned to the corresponding device without performing processing on the intermediate keys.

Particularly, the first Trusted Authority TA-SIM associates the first preset secret key $Ksyk_{SIM}$ to the first device SIM and the latter stores it inside its own memory (STORE1 step) as schematically shown in FIG. 1.

Similarly, the second Trusted Authority TA-ME associates the second secret key $Ksyk_{ME}$ to the second device ME for the latter to store it inside in a second memory (step STORE2).

For example, the mobile telephone provider could manufacture its own smart cards storing in each one the corresponding secret key $Ksyk_{SIM}$. Or this secret key could not be memorized initially in each smart card, but each smart card could generate it when necessary. It should be observed that such secret keys are different for each smart card.

The initialization procedure described would take place, for example, during the final manufacturing steps of the devices, i.e., before they become available to users.

In order for a communication encrypted by key to be established between the first SIM and the second ME device it is necessary, first of all, that these devices are connected.

Particularly, the connection between the two devices is direct when, for example, the smart card is inserted into the mobile equipment in such a way that the first SIM and the second ME device are in electrical contact with one another. Alternatively, the connection between the first SIM and the second ME device can take place at a distance by means of suitable transmission means (for example, mobile radio networks).

Figure 2:
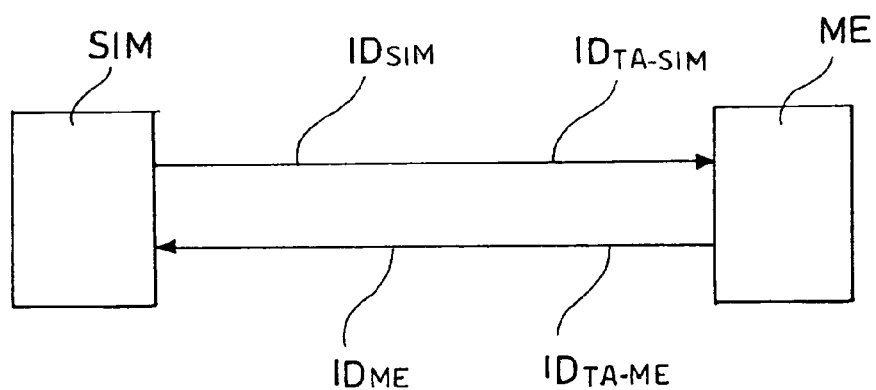
FIG. 2 schematically represents an identity exchange step between devices for encrypted communication in accordance with the present invention.

Subsequent to connection, the first device SIM sends its own first identity $ID_{SIM}$ and the further first identity $ID_{TA-SIM}$ of the first Authority TA-SIM to the second device ME, and vice versa. This step is shown schematically in FIG. 2.

After the sending of the identities, the method of the invention comprises session key generation steps that can be used by the first SIM and by the second ME device as secret keys for establishing an encrypted communication between them. In other words, such secret session keys will be used, during a communication session, in order to encrypt and decrypt all the subsequent messages exchanged between the two devices.

During such session key generation steps the mutual authentication of the two SIM and ME devices occurs.

The method of the invention provides three preferred embodiments of the generation of such secret session keys.

Figure 3A:
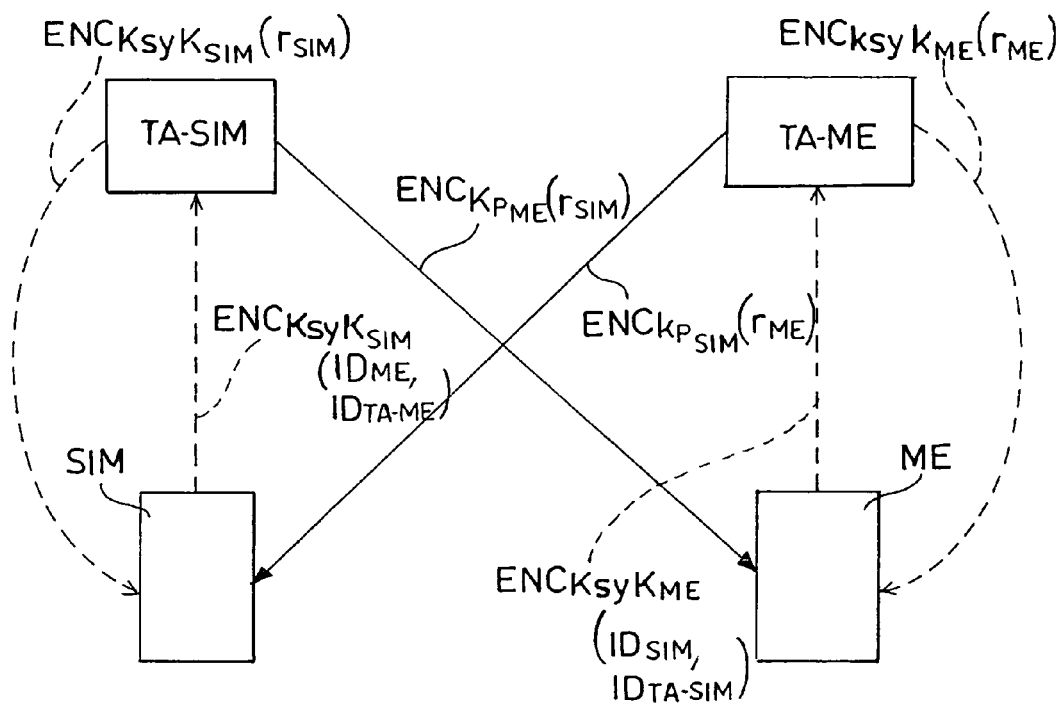
FIGS. 3a and 3b schematically show a first preferred embodiment of the method of the invention relating to the generation of secret keys.

FIG. 3a illustrates a first preferred embodiment of the generation of the secret session keys, in accordance with the invention.

Firstly, it should be observed that the transmission of encrypted messages in a symmetrical way is easily applicable between each device and the corresponding Trusted Authority.

In actual fact, the first/second Authority TA-SIM/TA-ME shares with the first/second device SIM/ME the first/second secret key $Ksyk_{SIM}/Ksyk_{ME}$. For example, in symmetrical modality, the first device SIM uses the first secret key $Ksyk_{SIM}$ to encipher a message to be transmitted to the first Authority TA-SIM. On its part, the first Authority TA-SIM deciphers this message by using the same key. This also applies for messages transmitted by the first Authority to the first device SIM and, in the same way, in the symmetrical-type encrypted communication between the second device ME and the second Authority TA-ME using the second secret key $Ksyk_{ME}$.

It should be observed that, as is evident for one of ordinary skill in the art, the invention method can include the transmission of further information in addition to that contained in the messages that will be described explicitly below.

With reference to FIG. 3a, the first device SIM transmits to the first Authority TA-SIM a message containing the second identity $ID_{ME}$ and the further second identity $ID_{TA-ME}$ that the same first device SIM has received from the second device ME in the previous step. Before being transmitted, the above-mentioned identities are enciphered with the first secret key $Ksyk_{SIM}$ in such a way that the first Authority TA-SIM can decipher them with the same key in accordance with the above-mentioned encryption method.

In greater detail, the message transmitted contains the encrypted identities in accordance with the following notation that is also indicated in FIG. 3a:

$$ENC_{Ksyk_{SIM}}(ID_{ME}, ID_{TA-ME}) \qquad (3)$$

where ENC indicates the encryption operation performed on the second $ID_{ME}$ and on the further second $ID_{TA-ME}$ identity by means of the key $Ksyk_{SIM}$. This encryption operation is performed in accordance with the preset symmetrical key encryption algorithm.

The first Authority TA-SIM decrypts the message received in accordance with the notation (not shown in FIG. 3a)

$$DEC_{Ksyk_{SIM}}(ENC_{Ksyk_{SIM}}(ID_{ME}, ID_{TA-ME})) \qquad (4)$$

where DEC indicates the decryption operation performed on (3) by the key $Ksyk_{SIM}$. This decryption operation consents the first Authority TA-SIM to know (i.e., to store in a suitable memory) the second $ID_{ME}$ and the further second $ID_{TA-ME}$ identity. In other words, the first Authority TA-SIM is informed about the type of the second device ME (for example the type of mobile equipment) and on other data relative to the second Authority TA-ME. Particularly, having acquired the second identity $ID_{ME}$, the first Authority TA-SIM is capable of generating (and therefore storing) the second public key $Kp_{ME}$ associated with the second device ME. In greater detail, the first Authority TA-SIM applies to the second identity $ID_{ME}$ the first hash function H (common to both Authorities) for generating said public key $Kp_{ME}$.

Subsequently, the first Authority TA-SIM generates a first numerical value $r_{SIM}$. In particular, this first numerical value is, preferably, a first number generated in a random way by the first Authority TA-SIM. This first random number $r_{SIM}$ is encrypted with the first secret key $Ksyk_{SIM}$ and sent as a message by the first Trusted Authority TA-SIM to the first device SIM. The message sent contains the first random number $r_{SIM}$ encrypted in symmetrical mode in accordance with the following notation (of the same type as the notation (3)) that is also indicated in FIG. 3a:

$$ENC_{Ksyk_{SIM}}(r_{SIM}) \qquad (5)$$

The message in accordance with the notation (5) is received and decrypted (with the same secret key $Ksyk_{SIM}$) by the first device SIM. This takes place in accordance with the following notation (the same as (4) and it is also not indicated in FIG. 3a):

$$DEC_{Ksyk_{SIM}}(ENC_{Ksyk_{SIM}}(r_{SIM})) \qquad (6)$$

It should be observed that if the first device SIM is capable of decrypting, with the first secret key $Ksyk_{SIM}$, this message received from the first Authority TA-SIM, it is automatically authenticated, that it is not possible for a clone to substitute it.

Thus, the first device SIM can know (and store in a suitable memory) the first random number $r_{SIM}$.

Alternatively, the encryption and decryption operations associated with the transmission to the first device SIM of the first number $r_{SIM}$ can be performed not according to the symmetrical method, but rather by means of the IBE-type asymmetrical method. In this case the encryption key used is the first public key $Kp_{SIM}$ and the decryption key is the first intermediate key $Ki_{SIM}$. Both these keys are known to the first Authority TA-SIM as they have been generated by it.

Moreover, the first Authority TA-SIM sends the same first random number $r_{SIM}$ to the second device ME. In this case, this number $r_{SIM}$ is encrypted to be sent as a message in accordance with the asymmetrical IBE method. This message is in accordance with the following notation, (also indicated in FIG. 3a):

$$ENC_{KpME}(r_{SIM}) \qquad (7)$$

which expresses the fact that the encryption is performed on the first random number $r_{SIM}$ by means of the second public key $Kp_{ME}$.

The second device ME decrypts the (7) by means of the second intermediate key $Ki_{ME}$ in accordance with the notation:

$$DEC_{Ki_{ME}}(ENC_{KpME}(r_{SIM})) \qquad (8)$$

In this way, also the second device ME knows (and stores in a memory) the above-mentioned random number $r_{SIM}$.

It should be observed that if the second device ME is capable of decrypting, with its own second intermediate key $Ki_{ME}$ the (7) received from the first Authority TA-SIM, it is automatically authenticated, that is it is not a clone.

Also in reference to FIG. 3a, the preferred embodiment of the invention method also provides an exchange of encrypted messages that involves the second device ME and the second Authority TA-ME in an exactly specular way to that described previously.

In particular, the second device ME transmits to the second Authority TA-ME a message containing the first identity $ID_{SIM}$ and the further first identity $ID_{TA-SIM}$. In the same way as the previous case, this message contains the above-mentioned numbered identities (in a symmetrical way) with the second secret key $Ksyk_{ME}$ and it is indicated in FIG. 3a with the notation:

$$ENC_{Ksyk_{ME}}(ID_{SIM}, ID_{TA-SIM}) \qquad (9)$$

The second Authority TA-ME decrypts the message received with the same key $Ksyk_{ME}$ in accordance with the notation (not shown in FIG. 3a):

$$DEC_{Ksyk_{ME}}(ENC_{Ksyk_{ME}}(ID_{SIM}, ID_{TA-SIM})) \qquad (10)$$

Following decryption (10) the second Authority TA-ME knows (that is it stores in a suitable memory) the first $ID_{SIM}$ and the further first $ID_{TA-SIM}$ identity. In other words, the second Authority TA-ME is informed, for example, on the mobile telephone network provider.

Similarly to what was described in relation to the first Authority TA-SIM, the second Authority TA-ME is capable of generating (and therefore storing) the first public key $Kp_{SIM}$ associated with the first device SIM starting from the first identity $ID_{SIM}$. In greater detail, the second Authority TA-ME applies to the first identity $ID_{SIM}$ the first hash function H in order to generate said public key $Kp_{SIM}$.

Subsequently, the second Authority TA-ME generates a second numerical value $r_{ME}$ that is, preferably, a second number generated in a random way. This second random number $r_{ME}$ is encrypted with the second secret key $Ksyk_{ME}$ and sent as a message by the second Trusted Authority TA-ME to the second device ME. The message sent contains the second random number $r_{ME}$ encrypted in accordance with the following notation (also indicated in FIG. 3a):

$$ENC_{Ksyk_{ME}}(r_{ME}) \qquad (11)$$

The message in accordance with the notation (11) is received and decrypted (with the same secret key $Ksyk_{ME}$) by the second device ME in accordance with the following notation (not shown in FIG. 3a):

$$DEC_{Ksyk_{ME}}(ENC_{Ksyk_{ME}}(r_{ME})) \qquad (12)$$

Thus, the second device ME can know (and store in a suitable memory) the second random number $r_{ME}$.

Alternatively, the encryption and decryption operations associated with the transmission of the second number $r_{ME}$ can be performed by means of the asymmetrical IBE type method. In this case, the encryption key is the second public key $Kp_{ME}$ and the decryption key is the second intermediate key $Ki_{ME}$.

The second Authority TA-ME sends the same second random number $r_{ME}$ to the first device SIM. In this case, this number $r_{ME}$ is encrypted to be sent as a message in accordance with the IBE method. This message is in accordance with the following notation (indicated in FIG. 3a):

$$ENC_{Kp_{SIM}}(r_{ME}) \qquad (13)$$

The notation (13) indicates that the encryption on the second random number $r_{ME}$ is performed by means of the first public key $Kp_{SIM}$.

The first device SIM decrypts (13) by means of the first intermediate key $Ki_{SIM}$ in accordance with the notation:

$$DEC_{Ki_{SIM}}(ENC_{K_{PSIM}}(r_{ME})) \quad (14)$$

Consequently, the first device SIM knows or recognizes (and stores in a memory) the random number $r_{ME}$.

As a consequence of the exchange of messages described, both devices simultaneously know or recognize both the first $r_{SIM}$ and the second $r_{ME}$ random number. In definitive, such random numbers are comparable to two half keys: each device receives a half key from each of the two Authorities. For example, the first device SIM receives a half key ($r_{SIM}$) from the first Authority TA-SIM and a half key ($r_{ME}$) from the second Authority TA-ME.

Figure 3B:
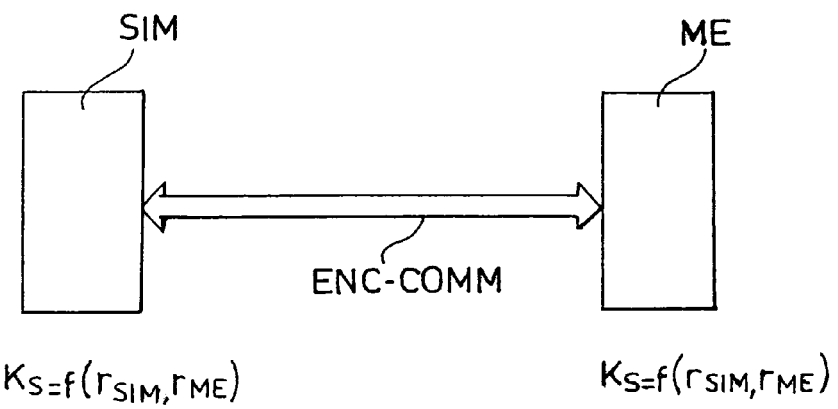

Starting from such random numbers or half keys, the first SIM and the second ME device generate a secret session key Ks. In accordance with FIG. 3b, the secret session key Ks is a function of both random numbers according to the equivalence:

$$Ks = f(r_{SIM}, r_{ME}) \quad (15)$$

where f( ) indicates a generic function that combines the first $r_{SIM}$ and the second $r_{ME}$ random number. For example, this function can be an XOR-type function applied to the above-mentioned numbers. As an alternative, this function f( ) can be, for example, the sum of two numbers obtained by applying a suitable hash function to the first $r_{SIM}$ and to the second $r_{ME}$ random number, or it can be a number that is obtained considering in sequence both the random numbers.

It should be observed that, according to the preferred embodiment, the secret session key Ks is the same for both the devices, because it is generated using the same function f( ). Advantageously, this secret session key Ks is used to establish an encrypted symmetrical communication ENC-COMM between the first SIM and the second ME device, in accordance with FIG. 3b.

The data transmission made in a symmetrical way is advantageous because less costly from a computational point of view and it requires less resources in terms of power to the devices involved in communication, compared to an asymmetrical type communication.

In accordance with the first embodiment described, the first TA-SIM and the second TA-ME Authority have the control of the entire protocol that enables generation of the secret session key Ks. In particular, the role of the above-mentioned Authorities is dominant in relation to that of the respective devices.

In addition, it should be observed that both the encryption algorithms and the procedures of the method with which the various encryption keys and the half keys are generated are implemented in hardware, software or hybrid mode, i.e., by combining both the preceding modalities. Particularly, the algorithms and the procedures of the method implemented by means of a software are contained in memories belonging to the Trusted Authorities or to the first SIM and the second ME device. The hardware type procedures are implemented by suitable electronic circuits.

For example, in correspondence with a Trusted Authority in which there are no limitations of dimensions or dissipation, such procedures can be implemented in hardware mode, i.e., by integrating electronic circuits. On the contrary, in the single devices (SIM or ME) in which the previous limitations are important it is preferred to implement the algorithms and the procedures of the method in software mode.

Figure 4A:
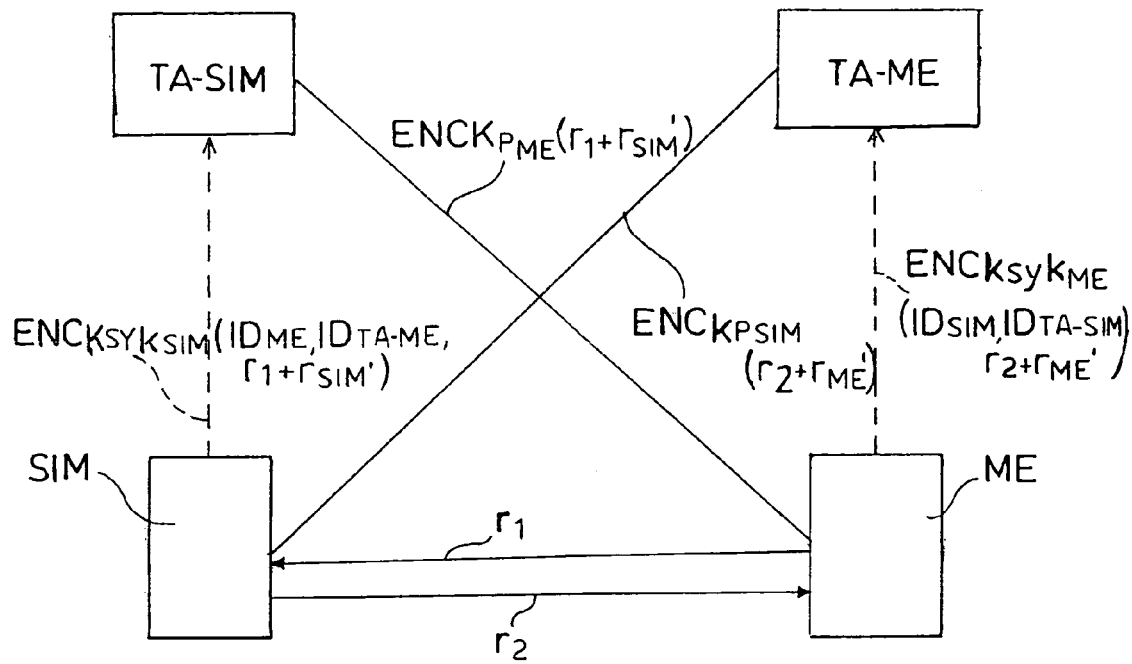
FIGS. 4a and 4b schematically show a second preferred embodiment of the method of the invention relating to the generation of secret keys.

With reference to FIG. 4a a second preferred embodiment of the generation of secret session keys, in accordance with the method of the invention, will be described.

In this case, the first SIM and the second ME device generate a first $g(r_1, r_{SIM}')$ and a second $g(r_2, r_{ME}')$ numerical value, respectively. The notation g( ) indicates any binary operation in which the opposite of an element is defined. According to a particular example, this operation g( ) is a binary sum and therefore the first numerical value $g(r_1, r_{SIM}')$ is given by the binary sum $r_1 + r_{SIM}'$ and the second numerical value $g(r_2, r_{ME}')$ is given by the binary sum $r_2 + r_{ME}'$. It should be observed that despite the fact that in this description express reference is made to the specific case of the binary sum "+", it must be intended as the possibility to apply not only said binary sum, but any other operation g( ) as defined previously.

Particularly, the first numerical value generated $r_1 + r_{SIM}'$ is calculated by means of a binary sum operation between two random integers, i.e., a first random number $r_{SIM}'$ and a third random number $r_1$. It should be observed that the first random number $r_{SIM}'$ is generated by the first device SIM, whereas the third random number $r_1$ is generated by the second device ME. In accordance with FIG. 4a, the second device ME transmits to the first device SIM the third number $r_1$ so that this first device SIM can generate the first numerical value $r_1 + r_{SIM}'$. It should be observed that this number $r_1$ is transmitted unencrypted, i.e., it is not encrypted. Said transmission takes place simultaneously to the transmission of the identities $ID_{ME}$ and $ID_{TA-ME}$ described above.

Similarly, the second numerical value generated $r_2 + r_{ME}'$ is calculated by means of a binary sum operation between two other random integers, i.e., a second random number $r_{ME}'$ and a fourth random number $r_2$. It should be observed, in this case, that the second random number $r_{ME}'$ is generated by the second device ME, whereas the fourth random number $r_2$ is generated by the first device SIM. As schematically shown in FIG. 4a, the first device SIM transmits unencrypted the fourth number $r_2$ to the second device ME (together with the identities $ID_{SIM}$ and $ID_{TA-SIM}$) so that the latter can generate the second numerical value $r_2 + r_{ME}'$.

Subsequently, the first device SIM transmits to the first Authority TA-SIM a message containing, in addition to the second $ID_{ME}$ and to the further second $ID_{TA-ME}$ identity, also the first numerical value $r_1 + r_{SIM}'$. Similarly to what described in relation to the first preferred embodiment, these identities and this numerical value are enciphered (in a symmetrical way) with the first secret key $Ksyk_{SIM}$ and the message transmitted is in accordance with the following notation (also indicated in FIG. 4a):

$$ENC_{Ksyk_{SIM}}(ID_{ME}, ID_{TA-ME}, r_1 + r_{SIM}') \quad (16)$$

The first Authority TA-SIM decrypts the message received with the same key $Ksyk_{SIM}$ in accordance with the notation (not shown in FIG. 4a):

$$DEC_{Ksyk_{SIM}}(ENC_{Ksyk_{SIM}}(ID_{ME}, ID_{TA-ME}, r_1 + r_{SIM}')) \quad (17)$$

In this way, the first Authority TA-SIM knows (i.e., stores it in the respective memory) the second identity $ID_{ME}$, the further second identity $ID_{TA-ME}$ and the first numerical value $r_1 + r_{SIM}'$. In addition, the first Authority TA-SIM generates the second public key $Kp_{ME}$ starting from the second identity $ID_{ME}$.

Alternatively, the encryption and decryption operations associated with the transmission of the second identity $ID_{ME}$, of the further second identity $ID_{TA-ME}$ and of the first numerical value $r_1 + r_{SIM}'$ can be performed in accordance with the asymmetrical IBE-type method. In this case, the first device SIM encrypts the message by means of a public key associated with the first Authority TA-SIM, that is a further first public key $Kp_{TA-SIM}$. The first device SIM obtains this key $Kp_{TA\text{-}SIM}$ by applying the first hash function H to the further first identity $ID_{TA\text{-}SIM}$. The first Authority TA-SIM decrypts the message received by means of its own private key. This latter key is obtained by multiplying this further public key $Kp_{TA\text{-}SIM}$ for the first master key $s_{TA\text{-}SIM}$ in the same way as (1).

By means of the second public key $Kp_{ME}$, the first Authority TA-SIM encrypts the first numerical value $r_1+r_{SIM}'$ in order to send it as a message to the second device ME in accordance with the IBE method. This encrypted method is in accordance with the following notation, that is also indicated in FIG. 4a:

$$ENC_{K_{PME}}(r_1+r_{SIM}') \qquad (18)$$

The encrypted message is received and decrypted with the second intermediate key $Ki_{ME}$ by the second device ME, that is in accordance with the following notation:

$$DEC_{Ki_{ME}}(ENC_{K_{PME}}(r_1+r_{SIM}')) \qquad (19)$$

In definitive, the second device ME can know (and store in its own memory) the first numerical value $r_1+r_{SIM}'$.

Still with reference to FIG. 4a and symmetrically to the previous case, the second preferred embodiment of the method provides the exchange of encrypted messages that involves the second device ME and the second Authority TA-ME.

Particularly, the second device ME transmits to the second Authority TA-ME a message containing, in addition to the first $ID_{SIM}$ and to the further first $ID_{TA\text{-}SIM}$ identity, also the second numerical value $r_2+r_{ME}'$. Such identities and such numerical value are enciphered (in a symmetrical way) with the second secret key $Ksyk_{ME}$ and in definitive the message transmitted is in accordance with the following notation (indicated in FIG. 4a):

$$ENC_{Ksyk_{ME}}(ID_{SIM}, ID_{TA\text{-}SIM}, r_2+r_{ME}') \qquad (20)$$

The second Authority TA-ME decrypts the message received with the same key $Ksyk_{ME}$ in accordance with the notation (not shown in FIG. 4a):

$$DEC_{Ksyk_{ME}}(ENC_{Ksyk_{ME}}(ID_{SIM}, ID_{TA\text{-}SIM}, r_2+r_{ME}')) \qquad (21)$$

In this way, the second Authority TA-ME knows or recognizes (i.e., stores in a suitable memory) the first identity $ID_{SIM}$, the further first identity $ID_{TA\text{-}SIM}$ and the second numerical value $r_2+r_{ME}'$. In particular, the second Authority TA-ME generates the first public key $Kp_{SIM}$ from the first identity $ID_{SIM}$.

Alternatively, the encryption and decryption operations necessary for the transmission of the message containing the first identity $ID_{ME}$, the further first identity $ID_{TA\text{-}ME}$ and the second numerical value $r_2+r_{ME}'$ can be performed in accordance with the IBE method. In this case, the second device ME encrypts this message by means of a public key associated with the second Authority TA-ME, that is a further second public key $Kp_{TA\text{-}ME}$. The second device ME generates this key $Kp_{TA\text{-}ME}$ by applying the first hash function H to the further second identity $ID_{TA\text{-}ME}$. The second Authority TA-ME decrypts the message received by means of its own private key. In the same way as (1), this latter key is obtained by multiplying such further public key $Kp_{TA\text{-}ME}$ by the second master key $S_{TA\text{-}ME}$.

By means of the first public key $Kp_{SIM}$, the second Authority TA-ME encrypts the second numerical value $r_2+r_{ME}'$ in order to send it as a message to the first device SIM in accordance with the IBE method. This encrypted message is in accordance with the following notation (also indicated in FIG. 4a):

$$ENC_{K_{PSIM}}(r_2+r_{ME}') \qquad (22)$$

The message of the notation (22) is received by the first device SIM and is decrypted with the first intermediate key $Ki_{SIM}$, that is in accordance with the following notation:

$$DEC_{Ki_{SIM}}(ENC_{K_{PSIM}}(r_2+r_{ME}')) \qquad (23)$$

In definitive, the first device SIM can know or recognize (and store in a suitable memory) the second numerical value $r_2+r_{ME}'$.

At this point, the first device SIM performs a difference operation between the second numerical value $r_2+r_{ME}'$ acquired and the fourth random number $r_2$ (generated by the device SIM for the device ME and therefore already memorized in SIM). This difference is in accordance with the equation:

$$(r_2+r_{ME}')-r_2=r_{ME}' \qquad (24)$$

so that the first device SIM knows or recognizes (and memorizes or stores) the second random number $r_{ME}'$. In the same way, the second device ME performs the difference operation between the first numerical value $r_1+r_{SIM}'$ acquired and the third random number $r_1$ (generated by the device ME for the device SIM and therefore already memorized or stored in ME). This difference is in accordance with the equation:

$$(r_1+r_{SIM}')-r_1=r_{SIM}' \qquad (25)$$

so that the second device ME knows or recognizes (and memorizes or stores) the first random number $r_{SIM}'$.

Figure 4B:
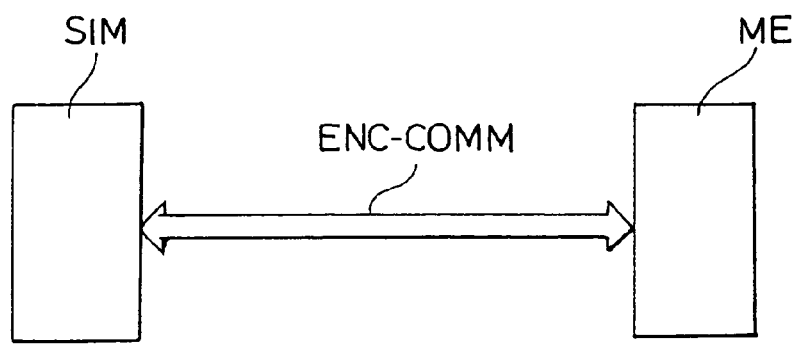

In definitive, both devices recognize both the first $r_{SIM}'$ and the second $r_{ME}'$ random number. Starting from such random numbers, the first SIM and the second ME device generate the same secret session key Ks that is a function of both such numbers in accordance with (15). For example, this session key Ks is equal to the algebraic sum of the first $r_{SIM}'$ and the second $r_{ME}'$ random number in accordance with the notation (shown in FIG. 4b):

$$Ks=g(r_{SIM}',r_{ME}')=r_{SIM}'+r_{ME}' \qquad (26)$$

By means of the secret session key Ks it is possible to establish symmetrical type encrypted communication ENC-COMM (FIG. 4b) between the first SIM and the second ME device.

Unlike the first embodiment, in this case the first SIM and the second ME device have a dominant role in the protocol of the invention with regards to the generation of the secret session key Ks. In particular, such devices generate, for example, with their own system of processing session key and the random numbers. On the other hand, the first TA-SIM and the second TA-ME Authority have a role of intermediation and authentication. In actual fact, each Authority makes available its own means for transmitting the numerical value generated by its own device to the other device.

Figure 5A:
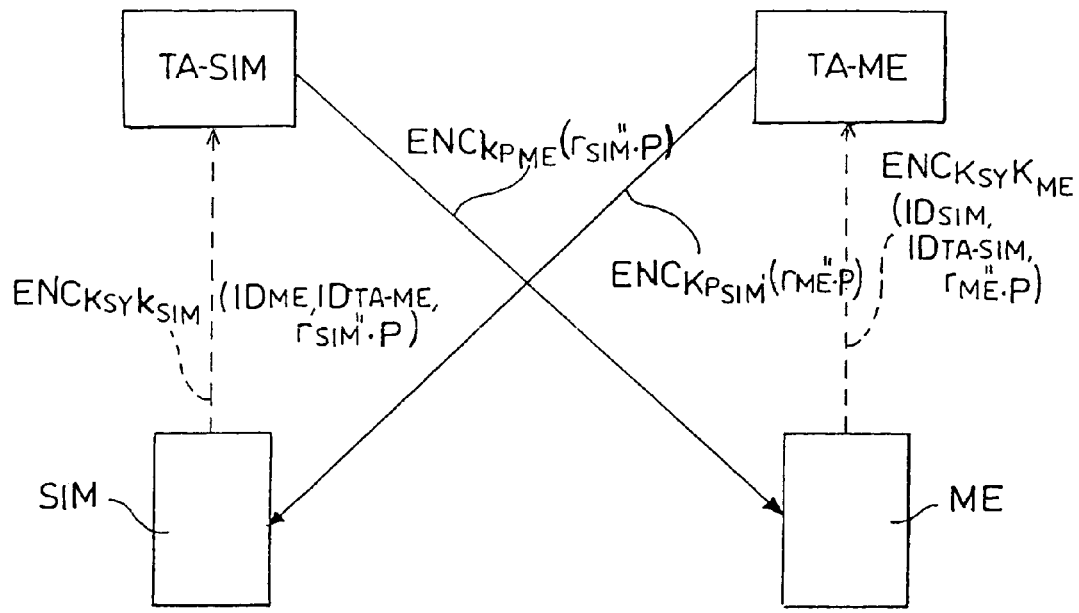
FIGS. 5a and 5b schematically show a third preferred embodiment of the method of the invention relating to the generation of secret keys.

With reference to FIG. 5a a third preferred embodiment of the generation of the secret session keys, in accordance with the invention, will be described.

In this case, the first SIM and the second ME device generate a first numerical value $r_{SIM}''\cdot P$ and a second numerical value $r_{ME}''\cdot P$, respectively.

Particularly, the first numerical value generated $r_{SIM}''\cdot P$ is calculated by means of an operation of external product in the additive group $G_1$ in accordance with (2). It should be observed that the first numerical value $r_{SIM}''\cdot P$ is the external product between a first random number $r_{SIM}''$ generated by the first device SIM and the point P of $G_1$, which is a point of an algebraic curve. As seen previously, this point P is one of the parameters characteristic of both Trusted Authorities.

In the same way, the second numerical value generated $r_{ME}''\cdot P$ is the external product in $G_1$ between a second random number $r_{ME}''$ generated by the second device ME and the same point P.

The first device SIM transmits to the first Authority TA-SIM a message containing, in addition to the second $ID_{ME}$ and to the further second $ID_{TA-ME}$ identity, also the first numerical value $r_{SIM}''\cdot P$. These identities and this numerical value are enciphered (in a symmetrical way) with the first secret key $Ksyk_{SIM}$ and the message transmitted is in accordance with the following notation (also indicated in FIG. 5a):

$$ENC_{Ksyk_{SIM}}(ID_{ME}, ID_{TA-ME}, r_{SIM}''\cdot P) \quad (27)$$

The first Authority TA-SIM decrypts the message received with the same key $Ksyk_{SIM}$ in accordance with the notation (not shown in FIG. 5a):

$$DEC_{Ksyk_{SIM}}(ENC_{Ksyk_{SIM}}(ID_{ME}, ID_{TA-ME}, r_{SIM}''\cdot P)) \quad (28)$$

In this way, the first Authority TA-SIM knows (i.e., stores in memory) the second identity $ID_{ME}$, the further second identity $ID_{TA-ME}$ and the first numerical value $r_{SIM}''\cdot P$. In the same way as in the previous case, the first Authority TA-SIM generates the second public key $Kp_{ME}$ starting from the first identity $ID_{ME}$.

In the same way as done previously, the above-mentioned encryption and decryption messages can be performed in accordance with the asymmetrical IBE-type method. Particularly, the keys used are the same as those introduced for the second preferred embodiment, i.e., $Kp_{TA-SIM}$ and $Ki_{TA-SIM}$.

By means of the second public key $Kp_{ME}$, the first Authority TA-SIM encrypts the first numerical value $r_{SIM}''\cdot P$ in order to send it as a message to the second device ME in accordance with the method IBE. This encrypted message is in accordance with the following notation that is also indicated in FIG. 5a:

$$ENC_{K_{PME}}(r_{SIM}''\cdot P) \quad (29)$$

The encrypted message is received and decrypted with the second intermediate key $Ki_{ME}$ by the second device ME, that is in accordance with the following notation:

$$DEC_{Ki_{ME}}(ENC_{K_{PME}}(r_{SIM}''\cdot P)) \quad (30)$$

In definitive, the second device ME can know (and store in memory) the first numerical value $r_{SIM}''\cdot P$.

Still in reference to FIG. 5a and symmetrically to the previous case, one foresees an exchange of encrypted messages that involves the second device ME and the second Authority TA-ME.

Particularly, the second device ME transmits to the second Authority TA-ME a message containing, in addition to the first $ID_{SIM}$ and to the further first $ID_{TA-SIM}$ identity, also the second numerical value $r_{ME}''\cdot P$. Such identities and such numerical value are enciphered with the second secret key $Ksyk_{ME}$ and in definitive the message transmitted is in accordance with the following notation, $$ENC_{Ksyk_{ME}}(ID_{SIM}, ID_{TA-SIM}, r_{ME}''\cdot P) \quad (31)$$

The second Authority TA-ME decrypts the message received with the same key $Ksyk_{ME}$ in accordance with the notation (not shown in FIG. 5a)

$$DEC_{Ksyk_{ME}}(ENC_{Ksyk_{ME}}(ID_{SIM}, ID_{TA-SIM}, r_{ME}''\cdot P)) \quad (32)$$

Thus, the second Authority TA-ME knows (i.e., stores in memory) the first identity $ID_{SIM}$, the further first identity $ID_{TA-SIM}$ and the second numerical value $r_{ME}''\cdot P$. In particular, the second Authority TA-ME generates the first public key $Kp_{SIM}$ from the first identity $ID_{SIM}$.

The operations of encryption and decryption associated with the above-mentioned transmission can be performed in accordance with the IBE method. In this case the encryption and decryption keys are $Kp_{TA-ME}$ and $Ki_{TA-ME}$, respectively.

By means of the first public key $Kp_{SIM}$, the second Authority TA-ME encrypts the second numerical value $r_{ME}''\cdot P$ in order to send it as a message to the first device SIM in accordance with the IBE method. This encrypted message is in accordance with the following notation that is also indicated in FIG. 5a:

$$ENC_{K_{PSIM}}(r_{ME}''\cdot P) \quad (33)$$

The message of notation (33) is received from the first device SIM and is decrypted by the first intermediate key $Ki_{SIM}$, that is in accordance with the following notation:

$$DEC_{Ki_{SIM}}(ENC_{K_{PSIM}}(r_{ME}''\cdot P)) \quad (34)$$

In definitive, the first device SIM can know (and store in a suitable memory) the second numerical value $r_{ME}''\cdot P$.

Figure 5B:
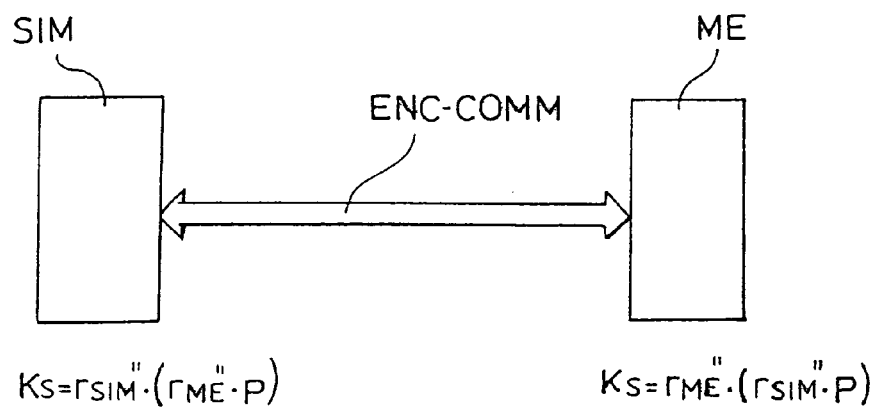

At this point, the first device SIM calculates the external product in accordance with the (2) between the second numerical value $r_{ME}''\cdot P$ acquired and the first random number $r_{SIM}''$ (generated and memorized previously by the same device SIM). In the same way, the second device ME calculates the external product between the first numerical value $r_{SIM}''\cdot P$ acquired and the second random number $r_{ME}''$ (generated and memorized previously by the same device ME). The above-mentioned products are in accordance with the notations (shown in FIG. 5b):

$$Ks = r_{SIM}''\cdot(r_{ME}''\cdot P) \quad (35)$$

$$Ks = r_{ME}''\cdot(r_{SIM}''\cdot P) \quad (36)$$

and they have the same result, that is the secret session key Ks. In the same way as in the previous cases, by means of this key Ks it is possible to establish the symmetrical-type encrypted communication ENC-COMM between the first SIM and the second ME device in accordance with FIG. 5b.

In the same way as the second embodiment, the first SIM and the second ME device have a dominant role in the protocol for generating the secret session key Ks.

It is useful to observe that the secret session key Ks generated in the three cases described can be relative to each specific session of communication between devices. This key Ks can be recalculated in correspondence with each new session of calculation, such as, for example, in occasion of the switching on again of the mobile telephone.

Moreover, this key Ks can be changed during the same session of communication and in the event of identity re-updates by the first TA-SIM and the second TA-ME Authority (for example, when a date is associated with the identities).

One considerable advantage of the invention method is linked to the presence of two separate Trusted Authorities TA-SIM and TA-ME associated with the first SIM and to the second ME device, respectively. In this way, the companies producing the devices that communicate in an encrypted way are not obliged to share their databases and sensitive information as in the case in which a single external supervision Authority is present.

Moreover, the use of an identical secret session key for both devices makes it possible to make use of all the advantages of symmetrical communication.

The use of "half keys" (for example, the first random number $r_{SIM}$ and the second random number $r_{ME}$) presents the considerable advantage of allowing the construction of a secret session key suited to a difficult-to-breach encrypted communication, thus preventing a direct communication between the two trusted authorities.

Moreover, by not necessitating the sharing of databases between the Trusted Authorities, the method described is particularly versatile in that it can be used in the transmission of data in an encrypted way to conform to different communication standards such as, for example, the GSM (Global System for Mobiles) standard, the OMA (Optical Modulation Amplitude) standard or the third generation wireless communications standard 3GPP (3G Project Partnership).

It should be observed that if one of the two electronic devices is not authentic, i.e., if it is a clone, encrypted communication cannot take place. In actual fact, this device would not have the secret keys such as, for example, the key $Ksyk_{SIM}$ and the key $Ki_{SIM}$, with which to terminate the protocol in accordance with the three embodiments described.

In addition, the first embodiment of the invention method makes it possible for an authorized external authority, such as law enforcement officials, to be capable of accessing the half keys generated by the Trusted Authorities in order to decrypt the messages transmitted by devices to be checked. In the case of the second embodiment this is possible only partially in that it would be necessary to intercept the transmission of the random numbers $r_1$ and $r_2$ between the devices. Lastly, the third embodiment is practically unbreachable in that it is difficult to obtain $r_{SIM}"$ (or $r_{ME}"$) from $r_{SIM}"\cdot P$ (or from $r_{ME}"\cdot P$).

In addition, the method described activates automatically when it is necessary to establish the encrypted communication between two devices, i.e., not involve in any way the user of the devices.

Finally, subsequent to the creation of the encrypted communication with a suitable session key Ks between the first SIM and the second ME device, the method of the invention can be replicated. In other words, each of the two devices is capable of establishing a new encrypted communication with another device (for example remote) by means of a new secret session key Ks' different from Ks.

Obviously, to the method of the present invention for performing an encrypted communication by means of keys, those skilled in the art, with the aim of satisfying contingent and specific requirements, can make further alterations and variants, all however contemplated within the scope of the invention, as defined by the following claims.

The invention claimed is:

1. A method for establishing an encrypted communication by means of keys between a first electronic device associated with a first trusted authority and a second electronic device, the method comprising the steps of:
generating by the first trusted authority a contribution to a first secret key associated with the first device for the management of said communication and storing the first secret key in a memory in the first device;
generating by a contribution from a second trusted authority and at least in part by a contribution from said first trusted authority, a second secret key associated with the second device for the management of said communication, and storing the second secret key in a memory in the second device,
wherein the step of generation of the first key is performed at least in part by a contribution from the second trusted authority separate and autonomous in relation to said first trusted authority, said second trusted authority associated with the second device for the management of said communication,
and wherein the first secret key and the second secret key are kept secret from the second trusted authority and the first trusted authority, respectively, such that neither the first trusted authority nor the second trusted authority knows either of the first and second secret keys in full.

2. The method of claim 1 wherein the first and the second secret keys are identical to one another in order to enable the encrypted communication of a symmetrical type between the first device and the second device.

3. The method of claim 2 wherein the steps of generation of the first and second secret keys comprise the steps of:
sending from the second trusted authority to the first device an encrypted message containing a first numerical value;
sending from the first trusted authority to the second device an encrypted message containing a second numerical value;
providing a third and a fourth numerical value at the first and the second device, respectively; the first and the third numerical value provided at the first device being correlated to the second and to the fourth numerical value provided at the second device;
performing by means of the first device a first processing of the first and of the third) numerical value in order to obtain the first secret key;
performing by means of the second device a second processing of the second and of the fourth numerical value in order to obtain the second secret key; the first and the second processing allowing to obtain the first and the second secret key identical to one another.

4. The method of claim 3 wherein said steps of sending the first value from said second authority to the first device and sending said second value from said first authority to the second device are performed by encrypting the first and the second numerical value in accordance with an identity-based encryption method.

5. The method of claim 3 wherein the first and the second numerical value are generated by the second trusted authority and by the first trusted authority, respectively.

6. The method of claim 5 wherein the second numerical value is transmitted by the first trusted authority that generated it to the first device by means of an encrypted communication of a symmetrical type using the first symmetrical secret key.

7. The method of claim 3 wherein the first and the second numerical value are generated by the second device and by the first device, respectively; the method comprising in addition the steps of:
sending from the first device to the first trusted authority an encrypted message containing the second numerical value,
sending from the second device to the second trusted authority an encrypted message containing the first numerical value.

8. The method of claim 7 in which said steps of sending from the first device to the first trusted authority the second numerical value and sending from the second device to the second trusted authority the first numerical value are performed by encrypting the first and the second numerical value in accordance with an encryption method of a symmetrical type or in accordance with an identity-based method.

9. The method of claim 7 wherein the second numerical value is obtained starting from a first random contribution generated by said first device and a second random contribution generated by the second device in order to be supplied to the first device, and wherein the first numerical value is obtained starting from a third random contribution generated by said second device and a fourth random contribution generated by the first electronic device in order to be supplied to the first device.

10. The method of claim 9 wherein the second numerical value is a binary operation, preferably of the type in which is defined the opposite of an element between the first random contribution and the second random contribution, and wherein the first numerical value is a binary operation, preferably, of the type in which the opposite of an element is defined between the third random contribution and the fourth random contribution.

11. The method of claim 7 wherein the second numerical value is obtained from a combination of a first random quantity generated by said first device and a second quantity, and wherein the first numerical value is obtained as a combination of a third random quantity generated by said second device and said second quantity.

12. The method of claim 11 wherein the second numerical value is obtained as an external product in an additive group of the first random quantity and of the second quantity, and wherein the first numerical value is obtained as an external product in an additive group of the third random quantity and said second quantity.

13. The method of claim 7 wherein the second numerical value is transmitted by the first device that generated it to the first trusted authority by means of a symmetrical type encrypted communication using the first symmetrical secret key.

14. The method of claim 7 wherein the second numerical value is transmitted by the first device that generated it to the first trusted authority by means of an identity-based type encrypted communication and using a further first public key obtained starting from the identity of the first trusted authority and from a further first private intermediate key in turn obtained starting from the further first public key.

15. The method of claim 3 wherein the message containing the first numerical value is sent in an encrypted way by means of the first public key.

16. The method of claim 1 wherein respective identities are associated with the first device and with the second device and with the first authority and with the second authority; the method also comprising the steps of:
  generating a first public key obtained starting from the identity of the first device,
  generating a first private intermediate key obtained starting from the first public key and from a first master key available to the first trusted authority,
  generating by said first authority a first symmetrical secret key associated with the first device and to be used for an encrypted communication of a symmetrical type between the first device and said first authority, said first symmetrical secret key obtained starting from the first intermediate key,
  supplying said first symmetrical secret key to the first device,
  sending in a non-encrypted mode from the first device to the second device and vice versa the identity of the said devices and said authorities.

17. The method of claim 16, also comprising:
  a first step of transmission in an encrypted way the identities of the second device and of the second authority from the first device to the first authority,
  a second step of transmission in an encrypted way of the identities of the first device and of the first authority from the second device to the second authority.

18. The method of claim 17 wherein the first and the second step of transmission are performed in a symmetrical way using, respectively, the first symmetrical secret key and a second symmetrical secret key supplied to the second device.

19. The method of claim 16 wherein said first symmetrical secret key associated with the first device is directly generated by the first trusted authority without using the first intermediate key.

20. The method of claim 1 wherein said first device is a smart card and said second device is a mobile telephone.

21. A system of encrypted communication by keys comprising:
  a first electronic device associated with a first trusted authority,
  a second electronic device associated with a second trusted authority,
  the first and second devices configured so that the encrypted communication is established in accordance with the method of claim 1.

22. A method of establishing encrypted communication by means of keys between a first electronic device associated with a first trusted authority and a second electronic device associated with a second trusted authority, the method comprising:
  generating by the first trusted authority and at least in part by means of the second trusted authority associated with the second device that is distinct and autonomous from the first trusted authority respective contributions to a first secret key associated with the first device and storing the first secret key in a memory of the first electronic device;
  generating by the second trusted authority and at least in part by means of the first trusted authority associated with the first electronic device respective contributions to a second secret key associated with the second device and storing the second secret key in a memory of the second electronic device; and
  maintaining the first secret key secret from the second trusted authority and maintaining the second secret key secret from the first trusted authority, such that neither the first trusted authority nor the second trusted authority knows either of the first and second secret keys in full.

23. The method of claim 22 wherein the first device is a smart card and the second device is a mobile telephone.

24. A method of encrypted communication between a first electronic device associated with a first identity and a first trusted authority and a second electronic device associated with a second identity and a second trusted authority, the method comprising:
  generating a first public key obtained from the identity of the first electronic device;
  generating a first private intermediate key obtained from the first public key and from a first master key available to the first trusted authority;
  generating by the first trusted authority a contribution to a first symmetrical secret key associated with the first device to be used for encrypted communication of a symmetrical type between the first electronic device and the first trusted authority, the first symmetrical key obtained staffing from the first intermediate key;
  generating by the second trusted authority a contribution to a second symmetrical secret key associated with the second electronic device that is generated, at least in part, by means of a contribution from the first trusted authority;
  supplying the first symmetrical key to the first electronic device; and
  sending in a non-encrypted mode from the first electronic device to the second electronic device, and vice versa, the identity of the first and second electronic devices and the first and second trusted authorities, respectively, such that neither the first trusted authority nor the second trusted authority knows either of the first and second secret keys in full.

25. A method of encrypted communication between a smart card having a first trusted authority and a mobile telephone having a second trusted authority, comprising:

generating by the first trusted authority a contribution from a first secret key associated with the smart card for management of the encrypted communication, wherein generating the first secret key is performed at least in part by a contribution from the second trusted authority separate and autonomous in relation to the first trusted authority, and storing the first secret key in the smart card;

generating by a contribution from the second trusted authority and at least in part by a contribution from the first trusted authority a second secret key associated with the mobile telephone for the management of the encrypted communication, and storing the second secret key in the mobile telephone; and maintaining the first secret key and the second secret key secret from the second trusted authority and the first trusted authority, respectively, such that neither the first trusted authority nor the second trusted authority knows either of the first and second secret keys in full.

26. The method of claim 25 wherein the first and second secret keys are identical to one another in order to enable the encrypted communication of a symmetrical type between the smart card and the mobile telephone.

27. The method of claim 26 wherein the steps of generating the first and second secret keys comprise:

sending from the second trusted authority to the smart card an encrypted message containing a first numerical value;

sending from the first trusted authority to the mobile telephone an encrypted message containing a second numerical value;

providing a third and a fourth numerical value at the smart card and at the mobile telephone, respectively, the first and third numerical value provided at the smart card being correlated to the second and the fourth numerical value provided at the mobile telephone;

performing in the smart card a first processing of the first numerical value and the third numerical value in order to obtain the first secret key; and performing in the mobile telephone a second processing of the second numerical value and the fourth numerical value in order to obtain the second secret key, with the second secret key being identical to the first secret key.

28. The method of claim 27 wherein sending the first value from the second trusted authority to the smart card and sending the second value from the first trusted authority to the mobile telephone are performed by encrypting the first numerical value and the second numerical value in accordance with an identity-based encryption method.

29. The method of claim 28 wherein the first numerical value is generated by the second trusted authority and the second numerical value is generated by the first trusted authority.

30. The method of claim 28 wherein the second numerical value is obtained from a combination of a first random quantity generated by the smart card and a second quantity, and wherein the first numerical value is obtained as a combination of a third random quantity generated by the mobile telephone and the second quantity.

31. The method of claim 28 wherein the second numerical value is obtained as an external product in an additive group of the first random quantity and of the second quantity, and wherein the first numerical value is obtained as an external product in an additive group of the third random quantity and the second quantity.

32. A method for establishing an encrypted communication by means of keys between a first electronic device associated with a first trusted authority and a second electronic device, the method comprising the steps of:

generating by the first trusted authority a contribution to a first secret key associated with the first electronic device for the management of said communication and storing it in the first device;

generating by a second trusted authority a contribution to a second secret key associated with the second device for the management of said communication and storing it in the second electronic device, wherein the step of generation of the first secret key is performed at least in part by a contribution from the second trusted authority separate and autonomous in relation to the first trusted authority, the second trusted authority associated with the second electronic device for the management of the communication, and wherein the first secret key and the second secret key are kept secret from the second and the first trusted authority, respectively, such that neither the first trusted authority nor the second trusted authority knows either of the first and second secret keys in full; the first and the second secret keys are identical to one another in order to enable the encrypted communication of a symmetrical type between the first electronic device and the second electronic device, the steps of generation of the first and second secret keys comprise the steps of:

sending from the second trusted authority to the first electronic device an encrypted message containing a first numerical value;

sending from the first trusted authority to the second electronic device an encrypted message containing a second numerical value;

providing a third and a fourth numerical value at the first and the second electronic devices, respectively; the first and the third numerical value provided at the first electronic device being correlated to the second and to the fourth numerical value provided at the second electronic device;

performing by means of the first electronic device a first processing of the first and of the third numerical value in order to obtain the first secret key;

performing by means of the second electronic device a second processing of the second and of the fourth numerical value in order to obtain the second secret key; the first and the second processing allowing to obtain the first and the second secret key identical to one another;

wherein the steps of sending the first numerical value from the second trusted authority to the first electronic device and sending the second numerical value from said first trusted authority to the second device are performed by encrypting the first and the second numerical value in accordance with an identity-based encryption method.

33. The method of claim 32 wherein the first and second numerical value are generated by the second trusted authority and by the first trusted authority, respectively.

34. The method of claim 32 wherein the first and the second numerical value are generated by the second device and by the first device, respectively; the method comprising in addition the steps of:

sending from the first device to the first trusted authority an encrypted message containing the second numerical value, sending from the second device to the second trusted authority an encrypted message containing the first numerical value.

* * * * *

UNITED STATES PATENT AND TRADEMARK OFFICE
CERTIFICATE OF CORRECTION

| | |
|---|---|
| PATENT NO. | : 7,620,186 B2 |
| APPLICATION NO. | : 10/952549 |
| DATED | : November 17, 2009 |
| INVENTOR(S) | : Fabio Sozzani et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1087 days.

<u>Column 20</u>
Lines 52-53, "symmetrical key obtained staffing from the first" should read as --symmetrical key obtained starting from the first--.

Signed and Sealed this

Twenty-first Day of September, 2010

David J. Kappos
*Director of the United States Patent and Trademark Office*